United States Patent Office 2,702,789
Patented Feb. 22, 1955

---

2,702,789

INHIBITING DEGRADATION OF QUEBRACHO DRILLING FLUIDS

Charles F. Teichmann, Crestwood, and Clifford G. Ludeman, Scarsdale, N. Y., and Allen D. Garrison, Houston, Tex., assignors to Texaco Development Corporation, New York, N. Y., a corporation of Delaware No Drawing. Application April 2, 1952,
Serial No. 280,191

20 Claims. (Cl. 252—8.5)

The present invention relates to the subsurface drilling of wells or bore holes, through underground formations and particularly to the drilling fluids or muds employed in such drilling operations.

More specifically the invention concerns drilling operations involving the continuous circulating of such drilling fluids or muds downwardly through the drill stem, to and about the bit of a rotary drilling rig and thence upwardly between the drill stem and the walls of the bore hole for the purpose of tapping underground reservoirs of oil, gas, brine, or water. In this operation, the drilling fluid serves to lubricate the drill stem and the bit, to transport the cuttings to the surface, to seal and hold in place the traversed walls of the bore hole, to impose a hydrostatic head upon the formation preventing the escape of high pressure fluids into the bore hole, and to perform numerous other functions.

The present invention is specifically applicable to such operations employing a water base drilling fluid or mud which, in addition to the usual suspension of clay, weighting agent and other typical mud constituent, depends upon small additions of a plant tannin extract such as quebracho for the purpose of controlling mud properties. The tannins, which term is meant to include the alkaline reaction products which result from addition of the extract to an alkaline mud, function as thinners to control the viscosity and thixotropy of the mud and are believed to act through a dispersive effect upon the mud gel structure which is reflected in a modification of mud viscosity. Also, the plant tannin derivatives exert another important effect in decreasing the fluid loss which occurs as the result of mud filtration along the wall of the bore hole. In addition, they tend to increase the strength and toughness of the filter cake thus formed on the walls of the bore hole.

As above intimated, the plant tannins are effective in relatively small proportions, as for example 0.5-5.0 pounds per barrel of mud, which however depends upon the specific mud to be treated, and is critical from the standpoint that their employment in excess, known as "overloading," may be detrimental.

In accordance with the present invention, the effective mud modifying properties of the plant tannin herein referred to as its "dispersive effect" or "dispersive properties" are protected against deterioration in the drilling fluid by the presence of a salt of the class consisting of the thiosulfate, hydrosulfite, hypophosphite and sulfite salts of the alkali or alkaline earth metals in a minor proportion insufficient to exert any appreciable flocculating effect upon the mud suspension.

The present invention follows from the discovery that in solution in a typical drilling fluid, particularly in the presence of caustic or other alkaline material, the tannin dispersant, such as quebracho, undergoes a progressive deterioration presumably due to atmospheric oxidation, with an accompanying loss of dispersive properties. The present invention is concerned with overcoming or inhibiting this deterioration.

More specifically, solutions of quebracho have been found to decrease in mud modifying effectiveness upon contact with air, ultimately becoming relatively ineffective from the standpoint of mud viscosity modification, suppression of fluid loss and the other desired characteristics herein referred to as dispersive properties.

For example, a caustic-quebracho mud treating solution comprising 10 gms. of quebracho extract and 5 gms. caustic soda per 100 ml. of water was tested for oxygen absorbing rate in a Burrell gas analyzer and then repeatedly retested after aeration for successive periods extending over approximately three weeks. In the initial absorption test the freshly prepared solution completely absorbed the test volume of oxygen in approximately 40 passes. However, after 24 hours aeration, only about 3% of the test volume of oxygen was absorbed in 60 passes through the solution, and after three weeks of further aeration, the oxygen absorbing capacity of the solution was further decreased. These results indicate, therefore, a progressive absorption of oxygen by the caustic-quebracho solution approaching an ultimate condition of saturation.

To determine the effect of oxygen absorption upon the properties of the plant tannin dispersant, one portion of the above treating solution was stored in a sealed, air-tight container, whereas a second portion was placed in a gas absorption container and subjected to aeration by a flow of air at the rate of 0.7 to 1.0 cubic foot per hour per 100 ml. of solution. After 16 days of aeration the sample was made up to the original volume with water and tested, in comparison with the first portion of treating solution, as an additive to a P-95 drilling mud. The results of these tests demonstrated a profound reduction in the dispersive effect of the aerated quebracho solution. For example, in the filtration tests, the aerated caustic-quebracho, in all cases, caused an actual increase in the rate of water loss by the standard A. P. I. filtration test, indicating an essentially complete destruction of the water loss modifying properties of the quebracho.

The deflocculating power of the aerated caustic-quebracho solution likewise evidenced substantial impairment. For example, the following table lists the modification in viscosity of the mud treated respectively with the aerated and non-aerated solutions:

| Caustic Quebracho Treating Solution | Quebracho, lb./bbl. mud | Percent change of Stormer viscosity at 600 R. P. M. |
|---|---|---|
| Aerated | 1.75 | −9.3 |
| Do | 3.50 | −5.8 |
| Non-aerated | 1.75 | −42.2 |
| Do | 3.50 | −56.8 |

Manifestly, therefore, the dispersive effect of the tannin component is seriously impaired by aeration in aqueous solution particularly in the presence of caustic.

In accordance with the present invention, it has been discovered that the foregoing deterioration of the tannin dispersant and of its mud improving properties which occurs in aqueous media such as drilling muds or treating fluids is overcome or inhibited by the presence of the foregoing protective agents, the dispersant fluid therefore maintaining its desired properties over long periods of time.

Accordingly, the primary advantage of the present invention resides in overcoming the deterioration of the vegetable tannin products and loss of their dispersant properties so that the amount of tannin extract required for mud formulation and maintenance is minimized and the process of drilling is accordingly rendered more economical.

This advantage is enhanced by the fact that the aforesaid protective agents are effective in only relatively small concentration in the aqueous fluid to protect against deterioration of the tannin. Such concentrations are of the order of about 0.001 pound mols per barrel.

On the other hand, however, substantial protection of the plant tannin is realized at concentrations of the protective agent lower than the foregoing, being appreciable even at concentrations ordinarily considered to be mere traces, in the region of about 0.0001 pound mol per barrel. Somewhat increased concentrations above optimum are not ordinarily detrimental, provided that they do not reach concentrations at which there is any evidence of a tendency to flocculate the suspended mud particles. Ordinarily no appreciable flocculation tendency is manifest at concentrations below 0.004 pound mol per barrel of mud.

Therefore, at the small concentrations required to protect the tannin decomposition, undesired side effects are not encountered. Accordingly, the concentration of the protective agent may be adjusted in a range of about 0.0001–0.004 pound mols per barrel of mud, or about 0.01 to about 1.0 and preferably not above 0.5 pound per barrel of mud.

It is also contemplated currently replenishing the mud as regards its content of protective agent to allow for mud loss and mud contamination, as well as for consumption of the protective agent which may take place during drilling. For example, relatively small quantities may be admixed with the mud at suitable operating intervals as required. Since, the extent of mud contamination or loss, or the intensity of the deteriorating influences are not normally predictable, it is preferable merely to maintain a current, desired concentration of protective agent in the mud. Alternatively, since the requirement for supplemental addition of protective agent is reflected by deterioration in dispersing effect, for example, supplemental additions of both dispersant and protective agent may be made in response to a detectable increase in mud filtration loss.

As above indicated the invention, in its broadest aspect, contemplates use of the protective materials in the form of, for example, their sodium, lithium, potassium or ammonium salts, as well as, their calcium, magnesium, strontium or barium salts, all of which are included in the term alkaline earth metal salts or alkali metal salts, as used herein. In general the sodium and calcium salts are preferred.

The preferred protective agent, of the foregoing group is however, calcium sulfite, which has a relatively flat temperature solubility curve at about 0.0002–0.0003 gm. mols per liter, and, therefore, is sufficiently insoluble so that it is incapable, under any circumstances, of exerting a flocculating or other undesirable effect on the mud constituents. In other words, by virtue of its low solubility, the calcium sulfite, regardless of the amount in which it is added, can not detrimentally affect the mud or exhibit "overloading," and may be added to the mud during its formulation or adjustment without exercising special precautions.

For example, whereas the more readily soluble inhibitor salts which in high concentrations adversely effect the mud, are preferably added in minute increments to avoid excessively high concentrations at the point of introduction, calcium sulfite may be added in localized excess and thereafter permitted to admix gradually throughout the mud.

Obviously, this is particularly advantageous in field operations where facilities for precise compounding are not always advisable or necessary. Moreover, it enables the deliberate addition of an excess of undissolved calcium sulfite which, in finely divided condition, remains suspended in the mud and thereby continuously available as a reservoir of make-up calcium sulfite available to dissolve in the aqueous fluid as required to maintain inherently the proper concentration for effective protection of the plant tannin. This advantage extends largely to the other alkaline earth sulfites as for example strontium sulfite.

It is important to note, however, that the preferred status of the calcium sulfite as regards the present invention does not, however, extend to the alkali metal sulfites, such as sodium sulfite which has a relatively high solubility in water. In general, therefore, preference is accorded to the class of inhibitors consisting of the thiosulfate, hydrosulfite, hypophosphite salts of the alkali metal and alkaline earth metals and the sulfite salts of the alkaline earth metals.

As above intimated, the present invention is applicable to water containing drilling muds which, in general, are typically formulated as a suspension of common clays together with specialized drilling clays such as bentonite, weighting agents such as barytes and iron oxide, and may contain many other conventional additives.

Ordinarily, the drilling fluid is rendered alkaline by the addition of caustic, sodium silicate or the like and may range from the low alkalinity muds having a pH about 7 to 9 to relatively high alkalinity muds with pH values ranging upwardly from pH 9 and frequently as high as 11.0 to 12.5. It is to the moderate and high alkalinity muds that the invention is particularly applicable due to the accelerated decomposition which the tannin dispersant tends to undergo in such media.

The invention is also applicable to drilling fluids containing starchy and proteinaceous materials incorporated to improve the so-called wall forming characteristics of the mud and increase resistance to loss of fluid through the so-called wall or filter cake deposited by the mud on formation surfaces along the bore hole.

The protective agent may be added to the mud during drilling in the usual manner by the aid of mud mixers in the drilling pit or in any other conventional manner.

It is particularly contemplated separately admixing the protective agent with the tannin extract prior to mud preparation, thus providing an inhibited dispersant and avoiding separate addition to the drilling fluid. In such cases a plant tannin extract such as quebracho may be mixed with about 1–10% of calcium sulfite for example, and supplied as such to the location where the mud is prepared or compounded, thus avoiding the separate field handling of the inhibitor.

One typical example of a drilling fluid conforming to the present invention, comprises the P–95 mud, above mentioned, a high quality mud from Rosamond, California, to which is added about 2.0 pounds per A. P. I. barrel of quebracho and about 1.0 lb. of caustic soda. To this mixture there is added and carefully dispersed therein, about one-half pound of calcium sulfite per barrel. The mud remains stable at its compounded viscosity and filtration water loss over long, indefinite periods of atmospheric exposure.

The present invention is also applicable to aqueous drilling fluids which in addition to or in place of suspended solid particles include a dispersed oil phase formed of various fractions of crude or refined oil suitably emulsified in the aqueous phase in accordance with known practice. Dispersion of the aqueous phase in the oil phase is also contemplated.

In general, therefore, the invention comprehends stabilizing the effective properties of plant tannin materials in any drilling fluid comprising water, particularly under conditions of substantial alkalinity.

Expressions such as "plant tannin extracts" and "plant extract materials" as used herein are intended to include quebracho extract as well as such forms as the quebracho may take in drilling of the aqueous fluids, particularly under other alkaline conditions. Since, however, the desired dispersant properties are dependent upon the tannin constituents of the extract, the foregoing terms as used herein mean also the other and equivalent plant tannin extracts and derivatives, as for example, chestnut, divi-divi, gambier, hemlock, quercitron, osage, and the like, as well as tannic acid and gallic acid salts normally occurring as constituents of the drilling mud as a result of addition thereto of the plant tannin derivative.

Obviously, many modifications and variations of the above invention as herein set forth may be made without departing from the spirit and scope thereof, therefore, only such limitations should be imposed as are indicated in the appended claims.

We claim:

1. In the drilling of a well bore through a subsurface formation with a rotary drill wherein an aqueous, alkaline drilling fluid is continuously circulated through the drill stem and about the bit of a rotary drilling rig, said drilling fluid containing a viscosity controlling additive of the class consisting of plant tannin materials, the improvement which comprises circulating as said drilling fluid an aqueous alkaline drilling fluid containing a salt of the class consisting of the thiosulfate, hydrosulfite, hypophosphite and sulfite salts of the alkali and alkaline earth metals in a minor proportion insufficient to exert a substantial flocculating effect in the drilling fluid and sufficient to inhibit deterioration of the viscosity controlling properties of said plant tannin material contained in said fluid.

2. In the drilling of a well bore through a subsurface formation with a rotary drill wherein an aqueous, alkaline drilling fluid is continuously circulated through the drill stem and about the bit of a rotary drilling rig, said drilling fluid containing a viscosity controlling additive of the class consisting of plant tannin materials, the improvement which comprises circulating as said drilling fluid an aqueous alkaline drilling fluid containing a small proportion of calcium sulfite, insufficient to exert a substantial flocculating effect in the drilling fluid and sufficient to inhibit deterioration of the viscosity controlling properties of said plant tannin material contained in said fluid.

3. A composition effective as a drilling fluid modifier in boring subsurface formations by means of a rotary drill employing a continuously circulating aqueous, alkaline drilling fluid, said composition comprising a plant tannin material having associated therewith a salt of the class consisting of the thiosulfate, hydrosulfite, hypophosphite and sulfite salts of the alkali and alkaline earth metals in a minor proportion insufficient to exert a substantial flocculating effect in the drilling fluid and sufficient to inhibit deterioration of the viscosity controlling properties of said plant tannin material.

4. A composition effective as a drilling fluid modifier in the drilling of subsurface formations by means of a rotary drill employing a continuously circulating aqueous, alkaline drilling fluid, said composition comprising a plant tannin material having associated therewith calcium sulfite, in a minor proportion insufficient to exert a substantial flocculating effect in the drilling fluid and sufficient to inhibit deterioration of the viscosity controlling properties of said plant tannin material.

5. The method according to claim 1 wherein the said salt is incorporated in the drilling fluid in an amount equal to about 0.0001 to 0.004 lb. mols per barrel of mud.

6. The method according to claim 1 wherein the said salt is calcium sulfite which is incorporated in the drilling fluid in an amount equal to about 0.0001 to 0.004 lb. mols per barrel of mud.

7. The method according to claim 2 wherein the said salt is incorporated in the drilling fluid in an amount equal to about 0.0001 to 0.004 lb. mols per barrel of mud.

8. A composition according to claim 3 wherein said salt is present in said composition in an amount equal to about 1–10% on the basis of the plant tannin material present.

9. A composition according to claim 3 wherein said salt is calcium sulfite which is present in said composition in an amount equal to about 1–10% on the basis of the plant tannin material present.

10. A composition according to claim 4 wherein said salt is present in said composition in an amount equal to about 1–10% on the basis of the plant tannin material present.

11. An aqueous alkaline drilling fluid for boring subsurface formations by a rotary drilling operation, said fluid comprising a plant tannin material and having associated therewith a salt of the class consisting of the thiosulfate, hydrosulfite, hypophosphite and sulfite salts of the alkali and alkaline earth metals in a minor proportion insufficient to exert a substantial flocculating effect on the drilling mud.

12. An aqueous, alkaline drilling fluid for boring subsurface formations by a rotary drilling operation, said fluid comprising a plant tannin material and having associated therewith calcium sulfite in a minor proportion insufficient to exert a substantial flocculating effect on the drilling mud and sufficient to inhibit deterioration of the viscosity controlling properties of said plant tannin material.

13. In the drilling of a well bore through a subsurface formation with a rotary drill wherein an aqueous, alkaline drilling fluid is continuously circulated through the drill stem and about the bit of a rotary drilling rig, said drilling fluid containing a viscosity controlling additive of the class consisting of plant tannin materials, the improvement which comprises circulating as said drilling fluid an aqueous alkaline drilling fluid containing a thiosulfate salt of a metal of the class consisting of the alkali and alkaline earth metals in a minor proportion insufficient to exert a substantial flocculating effect in the drilling fluid and sufficient to inhibit deterioration of said plant tannin materials contained in said drilling fluid.

14. In the drilling of a well bore through a subsurface formation with a rotary drill wherein an aqueous, alkaline drilling fluid is continuously circulated through the drill stem and about the bit of a rotary drilling rig, said drilling fluid containing a viscosity controlling additive of the class consisting of plant tannin materials, the improvement which comprises circulating as said drilling fluid an aqueous alkaline drilling fluid containing a hydrosulfite salt of a metal of the class consisting of the alkali and alkaline earth metals in a minor proportion insufficient to exert a substantial flocculating effect in the drilling fluid and sufficient to inhibit deterioration of said plant tannin materials contained in said drilling fluid.

15. In the drilling of a well bore through a subsurface formation with a rotary drill wherein an aqueous, alkaline drilling fluid is continuously circulated through the drill stem and about the bit of a rotary drilling rig, said drilling fluid containing a viscosity controlling additive of the class consisting of plant tannin materials, the improvement which comprises circulating as said drilling fluid an aqueous alkaline drilling fluid containing a hypophosphite salt of a metal of the class consisting of the alkali and alkaline earth metals in a minor proportion insufficient to exert a substantial flocculating effect in the drilling fluid and sufficient to inhibit deterioration of said plant tannin materials contained in said drilling fluid.

16. In the drilling of a well bore through a subsurface formation with a rotary drill wherein an aqueous, alkaline drilling fluid is continuously circulated through the drill stem and about the bit of a rotary drilling rig, said drilling fluid containing a viscosity controlling additive of the class consisting of plant tannin materials, the improvement which comprises circulating as said drilling fluid an aqueous alkaline drilling fluid containing a sulfite salt of an alkaline earth metal in a minor proportion insufficient to exert a substantial flocculating effect in the drilling fluid and sufficient to inhibit deterioration of said plant tannin materials contained in said drilling fluid.

17. An aqueous, alkaline drilling fluid for boring subsurface formations by a rotary drilling operation, said fluid comprising a plant tannin material and having associated therewith a thiosulfate salt of a metal of the class consisting of the alkali and alkaline earth metals in a minor proportion insufficient to exert a substantial flocculating effect in the drilling fluid and sufficient to inhibit deterioration of said plant tannin materials.

18. An aqueous, alkaline drilling fluid for boring subsurface formations by a rotary drilling operation, said fluid comprising a plant tannin material and having associated therewith a hydrosulfite salt of a metal of the class consisting of the alkali and alkaline earth metals in a minor proportion insufficient to exert a substantial flocculating effect in the drilling fluid and sufficient to inhibit deterioration of said plant tannin materials.

19. An aqueous, alkaline drilling fluid for boring subsurface formations by a rotary drilling operation, said fluid comprising a plant tannin material and having associated therewith a hypophosphite salt of a metal of the class consisting of the alkali and alkaline earth metals in a minor proportion insufficient to exert a substantial flocculating effect in the drilling fluid and sufficient to inhibit deterioration of said plant tannin materials.

20. An aqueous, alkaline drilling fluid for boring subsurface formations by a rotary drilling operation, said fluid comprising a plant tannin material and having associated therewith a sulfite salt of an alkaline earth metal in a minor proportion insufficient to exert a substantial flocculating effect in the drilling fluid and sufficient to inhibit deterioration of said plant tannin materials.

References Cited in the file of this patent

UNITED STATES PATENTS

| 1,968,024 | Binns | July 31, 1934 |
| 2,088,590 | Engels | Aug. 3, 1937 |
| 2,560,930 | Campise | July 17, 1951 |